Nov. 19, 1963　　　D. P. CICCARELLI　　　3,111,050
ATTACHMENT FOR CHASING THREADS ON HORIZONTAL LATHES
Original Filed April 6, 1956
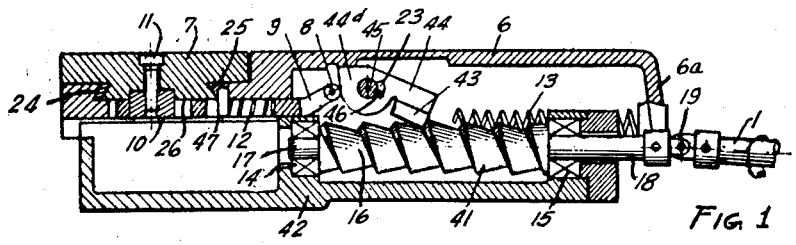
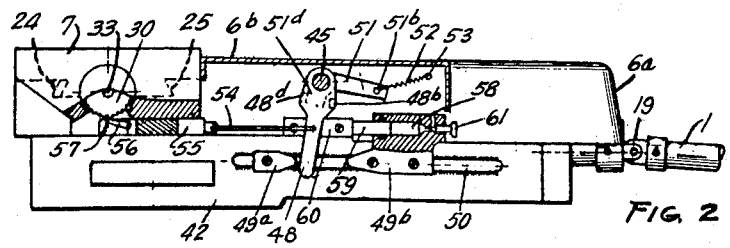
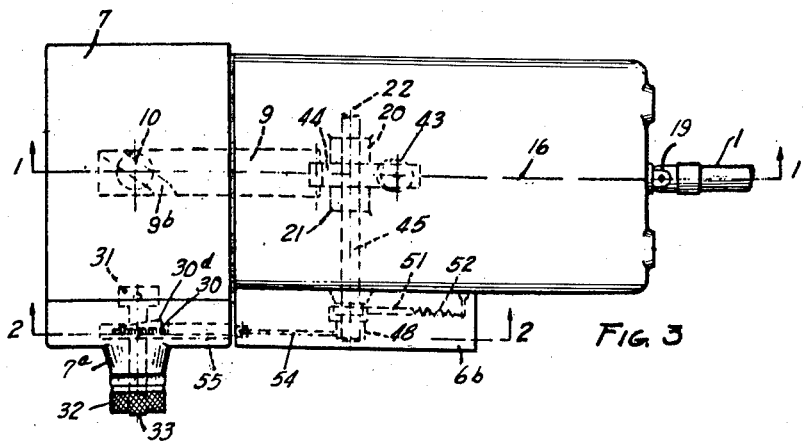
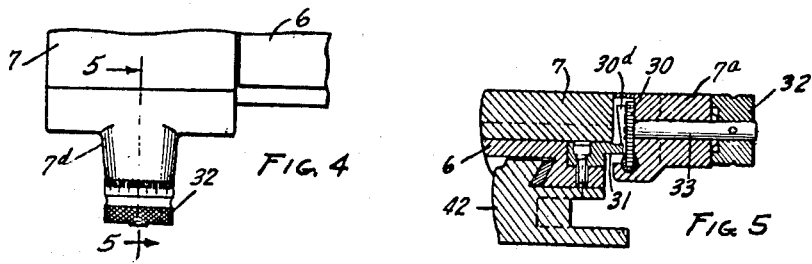
INVENTOR.
DON PIETRO CICCARELLI

United States Patent Office 3,111,050
Patented Nov. 19, 1963

3,111,050
ATTACHMENT FOR CHASING THREADS ON HORIZONTAL LATHES
Don Pietro Ciccarelli, Genoa-Sampierdarena, Italy, assignor to Istituto Salesiano Rebaudengo a Torino
Original application Apr. 6, 1956, Ser. No. 576,565, now Patent No. 3,073,194, dated Jan. 15, 1963. Divided and this application July 31, 1961, Ser. No. 128,105
Claims priority, application Italy Apr. 8, 1955
14 Claims. (Cl. 82—5)

This application is a division of my copending application Serial Number 576,565, filed April 6, 1956, for patent on Attachment for Chasing Threads on Horizontal Lathes, now Patent No. 3,073,194.

It is the chief object of the invention to provide a thread-chasing attachment which may be applied to existing lathes having a feed screw and which, once adjusted for any particular set-up, will operate automatically to complete the threads of each workpiece.

A still further object is to provide a threading attachment for lathes which is very versatile in being adjustable to threads covering a wide range of axial dimensions and locations axially along a workpiece.

Another object is to provide a threading attachment for lathes which is relatively simple and inexpensive to construct, positive and reliable in operation, easily adjustable, which may be used in a production line to reproduce threads indefinitely in any given workpiece and which is a general advance in the art of automatic and semiautomatic thread cutting attachments.

Other objects and advantages of my invention will become apparent to those skilled in the art, after a study of the following detailed description in connection with the accompanying drawing.

In the drawing:

FIGURE 1 is a vertical longitudinal cross section taken in a plane identified by the line 1—1, FIG. 3;

FIGURE 2 is a vertical longitudinal cross section in a plane identified by line 2—2, FIG. 3;

FIGURE 3 is a plan view;

FIGURE 4 is a detail view to an enlarged scale, of the construction by which the tool advance into the work is controlled and measured; and FIGURE 5 is a vertical cross-sectional detail view taken in a plane identified by the line 5—5, FIGURE 4.

For ready reference follows a list of parts:

1. Telescoping drive shaft
2. 
3. 
4. 
5. 
6. slide
   (*a*) Regal end portion FIG. 1
7. Tool carrier
   (*a*) Rearward projection
8. Roller or cam follower
   (*b*) Slot in 9
9. Release bar
10. Slide
11. Vertical pin on 7
12. Spring
13. Compression spring for slide 6 (2)
14. Antifriction bearing for 41
15. Antifriction bearing for 41
16. Axis of rotation of 41
17. Coaxial extension of 41
18. Coaxial extension of 41
19. Universal joint
20. Bearing for shaft, FIG. 3
21. Bearing for shaft, FIG. 3
22. Axis of shaft 45
23. Arcuate recess in 44
24. Way mounting 7 on 6
25. Way mounting 7 on 6
26. 
27. 
28. 
29. 
30. Ratchet wheel
   (*a*) Helicoidal cam
31. Cam follower for 30*a*
32. Knob on 33
33. Shaft
34. 
35. 
36. 
37. 
38. 
39. 
40. 
41. Feed screw
42. Base or carriage
43. Roller on end of 44
44. Follower lever
   (*a*) Cam hub of 44
45. Shaft
46. Lug or key integral w/shaft 45
47. Pin in slot of 9
48. Lever
   (*a*) lug
   (*b*) lug
49. 
   (*a*) stop
   (*b*) stop
50. Groove or channel
51. Bell crank (*a*) (*b*)
52. 
53. 
54. Link
55. Pawl rod
56. Pawl on 55
57. Spring for 56
58. Bore or cylinder
59. Plunger
60. Plate
61. Needle valve Referring in detail to the drawing, 42 identifies a base or carriage which is adapted to be rigidly clamped or otherwise fixed to the saddle or main carriage of a lathe having a lead screw. A slide 6 is mounted on base 42 as by ways, not shown, for guided translation in a horizontal direction which lies in the planes of FIGURES 1, 2 and 3. When base 42 is correctly fixed to the lathe saddle or main carriage, the direction of movement of slide 6 on carriage 42 is parallel with the axis of rotation of a workpiece mounted between lathe centers.

A feed screw 41 has coaxial integral extensions 17 and 18 at its respective ends by which it is journaled in antifriction bearings 14 and 15 for rotation about axis 16, FIGS. 1 and 3. These bearings are mounted in brackets shown as integral with, and upstanding from, carriage 42. Axis 16 is, of course, parallel with the direction of translation of slide 6 upon carriage 42. Bearings 14 and 15 are also capable of resisting axial thrust exerted thereon by the feed screw during operation.

The right extension 18, as the parts are viewed upon FIG. 1, is coupled by a universal joint 19 to one end of a telescoping shaft 1. The other end of this shaft, not shown, is coupled by a second universal joint to a gear driven from the lead screw of the lathe. The construction is well known and is shown, for example, at FIGURES 1 and 2 of British Patent 764,926. More particularly, the outboard or outer end of the lead screw of the lathe has a gear fixed thereto in mesh with a second gear journaled in the lathe bed upon an axis parallel to and offset from the axis of the lead screw. The shaft 1 consists of a first part slideably axially within a second part, there being a splined connection between the two parts so that they are compelled to rotate as a unit but may have relative sliding movement in the direction of their common axis. The free end of the aforesaid first part is connected with the aforesaid second gear, by a universal joint, not shown, but similar in all respects to 19.

By this construction, when the main carriage of the lathe is fixed to the ways and uncoupled from the lead screw, rotation of the latter rotates feed screw 41 at a rate determined by the selected gearing of the lathe. Likewise, the position of the invention upon the ways may be adjusted as desired, merely by operation of the lathe's carriage handle, the two parts of the shaft 1, etc., moving relatively axially to accommodate such adjustment.

Slide 6 has bearings indicated at 20 and 21, FIG. 3, depending from its top and journaling between them a shaft 45. As seen upon FIGS. 1 and 3, the axis 22 of this shaft is horizontally above and perpendicular to axis 16. A follower lever 44 is journaled upon shaft 45 and has a smooth fit between bearings 20 and 21 as indicated upon FIG. 3. The lever has a lost-motion connection with the shaft. This connection may take the form, as shown at FIG. 1, of a lug or key 46 fixed with and extending radially from shaft 45 and fitting an arcuate recess 23 in the hub of the lever. By this construction, shaft 45 rotates through a limited angle counterclockwise, for example, as viewed upon FIG. 1, before picking up lever 44. The purpose and proportions of the lost motion between shaft 45 and lever 44 will be subsequently explained in detail.

The end of lever 44 has a roller 43 journaled on its end, for rotation about an axis in the vertical plane of the axis of feed screw 41 and inclined relatively thereto at an acute angle to the right as the parts are viewed upon FIG. 1. The arrangement is such that there is substantial line contact between the roller 43 and the leading or operating face of the thread of screw 41 and the resultant line of thrust of the force, exerted upon lever 44 by rotation of the screw, passes a little below the axis of shaft 45, thus tending to rotate the lever clockwise and hold the same to the screw during a working stroke of the slide.

The hub of lever 44 is in the form of a cam 44a including a flat portion at its top which engages an abutment fixed with the under surface of the top or cover of slide 6. FIG. 1 shows the limiting position of clockwise rotation of the lever, due to engagement of the flat portion of the hub thereof with the aforesaid abutment. This is the position of the lever during the working stroke of the machine.

Slide 6 is provided with ways 24 and 25, FIGS. 1 and 2, extending horizontally and normal to the axis of screw 41. A tool carrier 7 has guides on its undersurface fitting between these ways so that the carrier is mounted on slide 6 for guided translation in a direction toward and from the centers of the lathe. The carrier 7 has a vertical pin 11 fixed therein and protruding from its lower surface. This pin journals a slide or follower 10.

Slide 6 has a channel 26, FIG. 1 in its lower face. This channel extends parallel with and in the vertical plane of axis 16. A release bar 9 slidably fits channel 26 for guided translattion parallel with axis 16. As best seen at FIG. 3, the left end of this bar has an upwardly-facing slot 9b having parallel sides inclined at about 45° to the direction of translation of the bar. The flat sides of follower 10 fit slot 9b so that translation of the bar relatively to slide 6 acts to correspondingly translate tool carrier 7 toward and from the axis of rotation of a workpiece journaled between lathe centers.

Referring more particularly to FIG. 1, the right end of bar 9 extends upwardly and carries a roller or cam follower 8 positioned to contact the cam surface 44a, of the hub of lever 44. This cam surface is so formed that on counterclockwise rotation of lever 44 from the position shown, bar 9 is shifted to the left to thereby move tool carrier 7 rearwardly away from the work. At the same time, of course, roller 43 is freed from screw 41. Such counterclockwise rotation is limited by any suitable stop means, such as contact with the top of slide 6. Tool release bar 9 is urged to the right, FIG. 1, by a compression spring 12 positioned within a longitudinal slot in the bar and which acts between the right end of the slot and a pin 47 having one end fixed in, and depending from slide 6 into the slot. Likewise, slide 6 is urged to the right, as viewed upon FIG. 1, by a pair of compressioin springs one of which is identified at 13 as lying behind screw 41 and acting at its left end against an abutment, not shown, on carriage 42, and at its right end against the depending end portion 6a of slide 6. The other spring 13 is symmetrically disposed on the forward side of screw 41 and hence does not appear upon FIG. 1.

Shaft 45 extends downwardly as seen in FIG. 3, into an auxiliary housing 6b of slide 6. A lever 48 is journaled on the end of shaft 45 within this housing and its end depends between two stops or abutments 49a and 49b, both of which are adjustably fixed in a longitudinally extending groove in carriage 42. Lever 48 is provided with a pair of symmetrically-disposed lugs 48a and 48b on its face opposite to the one seen in FIG. 2 and which extend axially of shaft 45. A bell crank 51 has its hub fixed on shaft 45 with a first arm projecting loosely between lugs 48a and 48b and the other arm extending to the right, FIG. 2. There is thus a lost-motion connection between lever 48 and bell crank 51. A compression spring 52 acts between an abutment 51b on the other arm of the bell crank and a second abutment 53 fixed with slide 6. The arrangement and disposition of the parts are such that, in the position shown upon FIG. 2, the line of thrust of spring 52 passes below the axis of shaft 45 and hence urges the bell crank into clockwise rotation. When the bell crank is pivoted in counterclockwise rotation from the position shown, abutment 51b crosses a line connecting abutment 53 with a point on the axis of shaft 45 and thereafter spring 52 urges bell crank 51 into counterclockwise rotation.

FIGURES 1 and 2 show the position of the parts as the slide 6 nears its leftward limiting position in a cutting stroke. As the slide moves a little further leftwardly, lever 48 engages stop 49a and is pivoted thereby counterclockwise relatively to slide 6. This pivoting also swings bell crank 51 and shaft 45 in the same direction. As lug 46, integral with shaft 45, picks up lever 44, the lever is also pivoted counterclockwise and (a) roller 43 is freed from screw 41; (b) cam 44a shifts bar 9 leftwardly relatively to slide 6, to retract tool carrier 7 from the work.

Tool carrier 7 is provided with a rearward projection 7a, FIGS. 3, 4 and 5 journaling a shaft 33 having a graduated knob 32 fixed to its rearwardly projecting end. As best shown upon FIG. 5, the forward end of shaft 33 has a ratchet wheel 30 and a helicoidal cam 30a fixed thereto. Conveniently the wheel and cam may be formed as a unitary part. The cam is disposed in position, as clearly shown upon FIG. 5, to contact a hardened cam follower 31 removably fixed with the contiguous portion of slide 6. The parts are so constructed and arranged that for each increment of clockwise rotation of wheel 30 and shaft 33, as seen in FIG. 2, the cam surface is correspondingly rotated to permit a proportional small additional translation of tool carrier 7 toward the axis of rotation of the work piece in the lathe, before cam 30a engages follower 31. It will be recalled that the carrier is being continuously urged toward the workpiece by spring 12.

A pawl rod 55, FIGS. 2 and 3, is mounted in portion 7a of carrier 7 for axial reciprocation parallel with axis 16, and carries a pawl 56, urged by spring 57, into contact with the wheel so that reciprocation of the rod acts in an obvious way, to rotate the wheel, shaft and cam 30a. The other end of rod 55, that is, the right end, FIG. 2, is connected by link 54 with the midportion of lever 48, previously described.

Since springs 13 to act to return slide 6 to starting position as soon as lever 44 has been pivoted to free roller 43 from screw 41, I provide means to control retrograde movement of the slide and to dampen the impact as it moves into final position ready for the next working stroke. This means is shown as a plunger 59 fixed with a plate 60 which, in turn, is screwed to slide 6. The plunger is parallel with axis 16 and so disposed and dimensioned as to fit a bore or cylinder 58 formed in a part of carriage 42. A needle valve 61 is threaded into a passage connecting the base of the cylinder with ambient air, and thus adjustable to control the rate of escape of trapped air and to correspondingly vary the damping of the slide, in a manner well known in the art.

*Operation*

Preparatory to chasing threads on a workpiece journaled between lathe centers, stops 49a and 49b are adjusted and fixed in and along channel 50 for the axial position and extent of the thread to be cut. Also knob 32 is turned to a position such that, as follower 31 drops off the abrupt or axial surface of cam 30a, the thread will have been completed to the required depth of cut. It will be understood that this abrupt surface of the cam lies in a plane passing through the axis of shaft 33. The tool on carrier 7 is then adjusted by its mounting means, not shown, into contact with the work surface to be threaded.

FIGURES 1 and 2 show the position of the parts near the end of a working stroke, that is, as slide 6 nears its limiting position to the left, under control of screw 41 which is being rotated from shaft 1 and the lead screw of the lathe, in timed relation with rotation of the workpiece, as determined by the desired pitch of the thread to be cut.

On slight leftward movement of slide 6 from the position shown, lever 48 engages stop 49a and is pivoted counterclockwise relatively to the slide. At this time compression spring 52 is urging arm 51a of bell crank 51, into contact with lug 48a of lever 48. Thus, pivoting of lever 48 as aforesaid also pivots the bell crank; and at the instant the point 51b crosses the neutral line from point 53 to the axis of shaft 45, spring 52 snaps the bell crank to its limiting position in the counterclockwise direction, FIG. 2. During this counterclockwise pivoting of the bell crank, shaft 45 on which it is journaled, is correspondingly pivoted; and when lug 46 fixed with the shaft picks up lever 44, the latter is also pivoted to its counterclockwise limiting position to raise roller 43 out of contact with screw 41 and, through cam hub 44a, to shift rod 9 leftwardly relatively to slide 6 and thus retract the tool on carrier 7 from the workpiece, against the thrust of spring 12. At the same time the counterclockwise pivoting of lever 48 pulls pawl rod 55 to the right. During this motion of the rod, pawl 56 rides over one or more teeth on wheel 30, depending upon the required tool advance toward the work for the next working stroke.

As lever 44 is freed from screw 41, springs 13 act to return slide 6 to starting or initial position, under the control of damping means 58, 59, 61, etc. The tool is at this time, of course, retracted from the work. During the retrograde translation of the slide, tool carrier and tool, lever 48 contacts stop 49b and is thereby pivoted in a clockwise direction from the limiting position to which it was moved by bell crank 51 in the counterclockwise direction. At this time bell crank arm 51a is in contact with lug 48b so that clockwise pivoting of lever 48 correspondingly pivots the bell crank; and when point 51b moves downwardly across the aforesaid neutral line of spring 52, the spring snaps the bell crank into the position shown. During this motion, arm 51a picks up lug 48a and moves lever 48 therewith into the limiting clockwise position shown. Clockwise pivoting of bell crank 51 and shaft 45, picks up arm 44 and, as the slide moves into initial position the arm moves down until roller 43 thereon engages the threads of screw 41. This pivotal movement of arm 44 also releases roller 8 and bar 9 to a small increment of translation to the right, under the urge of spring 12. Since cam 30a has been previously rotated through a small angle, by retrograde translation of the slide, the tool is free to advance toward the axis of work rotation under the urge of spring 12, a little further than during the previous work stroke, before cam 30a engages follower 31. The parts are now in position for the next cutting or working stroke.

The depth of thread is, of course, known in advance, and as previously explained, at the start of the operation, knob 32 is manually adjusted so that the thread is completed as the abrupt or axial riser portion of cam 30a reaches follower 31. Thus, the next succeeding retrograde stroke of slide 6 rotates this riser portion a little past follower 31, so that spring 12 acts to retract the tool entirely out of contact with the work where it remains, or would remain, during the next succeeding work stroke.

The operator is thus advised that the thread has been completed.

I have thus disclosed a threading attachment for lathes, of great versatility and usefulness. It is compact, reliable, highly accurate in production line work, and in turning out duplicate threads in workpieces. Further, the invention is readily and quickly adjustable to cutting threads of different dimensions axially of the work, and different positions axially along the work.

Numerous variations, modifications and substitutions of equivalents will occur to those skilled in the art, after a study of the foregoing disclosure. Hence this disclosure should be taken in an illustrative rather than a limiting sense. It is my desire and intention to reserve all such variations, modifications and substitutions within the scope of the subjoined claims.

Having now fully disclosed the invention, what I claim and desire to secure by Letters Patent is:

1. In a threading attachment for a lathe adapted to mount and rotate a workpiece about a first axis, said attachment comprising, a carriage, a slide mounted on said carriage for guided movement parallel with said first axis, a tool carrier mounted on said slide for guided movement toward and from said axis, a feed screw journaled in said carriage for rotation on a second axis parallel with said first axis, a lever carried by said slide and pivotable from a first position engaging said screw to a second position free of the same, first means yieldingly urging said tool carrier toward said first axis, and second means operated by and in response to rotation of said lever to said second position, to retract said tool carrier from said first axis against the urge of said first means.

2. In a threading attachment for a lathe adapted to mount and rotate a workpiece about a first axis, a carriage, a slide mounted on said carriage for guided translation parallel with said first axis, a tool carrier mounted on said slide for guided translation toward and from said axis, a feed screw journaled in said carriage for rotation on a second axis parallel with said first axis, a lever carried by said slide and pivotable from a first position engaging said screw, to a second position free of said screw, means responsive to relative translation between said carriage and said slide to pivot said lever, and means operated by movement of said lever to said first and second positions to respectively advance or retract said tool carrier relatively to said first axis.

3. A component for a screw-cutting attachment for a lathe adapted to mount and rotate a workpiece about a first axis, a carriage, a slide mounted to said carriage for guided translation parallel with said axis, a tool carrier mounted to said slide for guided translation thereon toward and from said axis, a bar mounted to said slide for guided translation parallel with said axis, a connection translating said tool carrier by and in response to translation of said bar, a lever pivoted to said slide and including cam means operable to translate said rod by and in response to pivoting of said lever, said lever being pivoted on said slide on a second axis normal to said first axis, a feed screw journaled in said carriage for rotation on an axis parallel with said first axis, said lever being engageable in a first position of rotation with the thread thereof to translate said slide in a cutting stroke, in response to rotation of said screw, said lever in a second position of rotation being free of said screw, first spring means urging one end of said bar into contact with said cam means, rotation of said lever and cam means to second position operating said bar to retract said tool carrier from said first axis against the urge of said first spring means, and second spring means urging said slide into retrograde movement along said first axis.

4. In a threading attachment for a lathe adapted to mount and rotate a workpiece about a first axis, a carriage, a slide mounted to said carriage for guided translation thereon parallel with said axis, a tool carrier mounted on said slide for movement toward and from said axis, a bar mounted on said slide for movement thereon, a connection between said carrier and said bar and operable to move said carrier by and in response to movement of said bar relatively to said slide, a feed screw journaled in said carriage for rotation on a second axis parallel with said first axis, a lever mounted to said slide for pivoting between first and second positions and including a cam surface, and yielding means urging one end of said bar into engagement with said cam surface, said lever in first position engaging said feed screw, pivoting of said lever to second position freeing the same from said feed screw and moving said cam surface to thereby move said bar and carrier against the urge of said yielding means.

5. In a threading attachment for a lathe adapted to rotate a workpiece about an axis, a carriage, a slide mounted on said carriage for movement parallel with said axis, a tool carrier mounted on said slide for movement toward and from said axis, bar means movably carried by said slide, a connection between said bar means and carrier and operable to move said carrier in response to movement of said bar means, a screw journaled in said carriage, a lever pivotable on said slide between a first position in engagement with the thread of said screw, to move said slide in a first direction in response to rotation of said screw, and a second position free of said screw, means urging said slide in a second direction opposite to said first direction, cam means connected for pivoting with said lever and contacting said bar means to move the same in response to pivoting of said lever to said second position.

6. A threading attachment as in claim 5, a spring acting between said slide and said bar means to urge said tool carrier toward said first axis, a cam mounted on said carrier, a follower fixed with said slide and urged into contact with said cam by said spring, said cam being adjustable to vary the approach of said carrier toward said axis.

7. In a threading attachment for lathes, a carriage, a slide mounted for guided translation in a direction on and along said carriage, a feed screw journaled in said carriage for rotation on an axis parallel with said direction, a shaft journaled in said slide transversely of said screw, a lever mounted on said shaft and pivotable from a first limiting position engaging the thread of said screw, to a second position free of said screw, a lost-motion connection between said shaft and lever, and means pivoting said shaft to move said lever between said first and second positions by and in response to translation of said slide on said carriage.

8. An attachment as in claim 7, the thread on said screw and said shaft being so constructed and arranged that rotation of said screw in one direction exerts a resultant thrust on said lever passing between said shaft and screw to hold said lever in said first position.

9. A thread-cutting attachment for a lathe adapted to mount a workpiece for rotation on a first axis, comprising; a carriage, a feed screw journaled in said carriage for rotation on an axis parallel with said first axis, a slide mounted on said carriage for guided translation parallel with said axis, a first lever carried by said slide for pivotal movement about an axis normal to said screw and offset therefrom, said first lever being pivotable from a first position in engagement with the thread of said screw, to a second position free and clear of said screw, rotation of said screw, acting through said first lever in first position, to translate said slide in a working stroke, and spring means urging said slide in retrograde translation.

10. An attachment as in claim 9, a pair of stops adjustably fixed in spaced relation on said carriage, a second lever pivoted to said slide coaxially of said first lever, a lost motion connection between said levers, said second lever extending between said stops to be engaged and reversely pivoted thereby for respective opposite directions of translation of said slide on and along said carriage.

11. An attachment as in claim 10, a tool carrier mounted to said slide for guided translation toward and from said first axis, a spring urging said carrier toward said axis, a cam adjustably carried by said carrier, a follower fixed with said slide and contacting said cam under urge of said spring means, and means adjusting said cam by and in response to pivoting of said second lever in one direction.

12. A thread-cutting attachment for a lathe adapted to mount and rotate a workpiece about a first axis, comprising a carriage, a feed screw journaled in said carriage for rotation on a second axis parallel with said first axis, a slide mounted on said carriage for guided translation parallel with said axes, a shaft journaled in said slide for pivoting about an axis normal to and above said second axis, first and second levers journaled on said shaft, a lost-motion connection between said first lever and shaft, said first lever being pivotable between a first limiting position wherein one end engages the thread of said feed screw and a second limiting position free of said screw, a pair of stops adjustably fixed with said carriage and spaced parallel with said axes, said second lever depending between said stops to be engaged and pivoted thereby for respective opposite directions of translation of said slide on and relatively to said carriage, a bell crank fixed to said shaft, a lost motion connection between one arm of said bell crank and said second lever, and a snap-over spring device connected with the other arm of said bell crank.

13. A thread-cutting attachment as in claim 12, said first lever having a cam hub, a bar mounted to said slide for guided translation parallel with said axes, a spring urging one end of said bar into engagement with said cam hub, a tool carrier mounted on said slide for guided translation toward and from said first axis, a connection between said bar and carrier translating the latter toward said axis under urge of said spring, movement of said first lever into second position acting through said cam hub to retract said carrier from said first axis.

14. A thread-cutting attachment as in claim 13, a follower fixed with said slide, a cam and ratchet wheel journaled on said carrier, said cam being urged into engagement with said follower by said spring, and a connection operating said ratchet wheel by and in response to pivoting of said second lever on engagement with one said stop.

References Cited in the file of this patent
UNITED STATES PATENTS
2,884,653     Hahn _____ May 5, 1959